United States Patent [19]

Wolfe

[11] 4,027,689

[45] June 7, 1977

[54] EXPLOSION RESISTANT ELECTRIC HEAT MOTOR GAS VALVE

[75] Inventor: Denis G. Wolfe, Santa Ana, Calif.

[73] Assignee: Robertshaw Controls Company, Richmond, Va.

[22] Filed: Apr. 21, 1976

[21] Appl. No.: 679,160

[52] U.S. Cl. .............................. 137/68 R; 48/192; 236/68 R; 251/11; 431/346
[51] Int. Cl.² .................................. F16K 13/06
[58] Field of Search .................. 48/192; 137/68 R; 236/68 R; 251/11; 431/346

[56] References Cited

UNITED STATES PATENTS

| 1,566,056 | 12/1925 | Westerfield | 251/11 |
|---|---|---|---|
| 2,077,735 | 4/1937 | Beckler | 251/11 |
| 2,118,443 | 5/1938 | McCorkle | 251/11 |
| 2,482,457 | 9/1949 | Bredecker | 48/192 |
| 2,810,631 | 10/1957 | Kanenbley | 48/192 |
| 2,913,320 | 11/1959 | Williams | 48/192 |
| 3,275,285 | 9/1966 | Morris | 251/11 |
| 3,464,227 | 9/1969 | Matthies | 251/11 |

*Primary Examiner*—Martin P. Schwadron
*Assistant Examiner*—G. L. Walton
*Attorney, Agent, or Firm*—Fulwider, Patton, Rieber, Lee & Utecht

[57] ABSTRACT

An explosion resistant gas valve in which a valve actuating mechanism in the form of a bimetallic strip is operated by an electric heat motor. An explosion containment structure is provided about the electric heat motor to isolate it from the path of gas flow. A plurality of pressure relief apertures extend through the sides of the containment structure.

7 Claims, 5 Drawing Figures

EXPLOSION RESISTANT ELECTRIC HEAT MOTOR GAS VALVE

FIELD OF THE INVENTION

The present invention relates to gas valves used to regulate the flow of natural gas or other combustible gaseous substances. In particular, the invention relates to those types of gas valves which employ a bimetallic strip as the valve actuating means and an electrical resistance coil, sometimes termed an electrical heat motor, as the controlling device for operating the bimetallic strip.

BACKGROUND OF THE INVENTION

In conventional gas control valves used to regulate the flow of natural gas or other combustible gaseous material for home heating, and for industrial heating and drying purposes, a thermostat is provided to regulate gas flow. The thermostat typically produces a electrical signal to the gas valve to open or close the valve. Typically the signal, which is a small electric current, is passed to an electrical resistance coil that encircles the bimetallic strip. Heat generated by the coil, or the absence of such heat, causes the bimetallic strip to deflect in one direction or another. This deflective movement of the bimetallic strip operates to open or close a valve to prevent gas from flowing into or out of a gas valve housing.

The use of such gas flow control valves in association with combustible gases has been criticized to a significant extent because of the danger of an explosion within the gas valve housing. It is possible that such an explosion could spread throughout the inlet and outlet gas lines connected to the housing. If an explosive mixture of air and gas is present in a gas line, and if the electrical resistance coil is damaged or defective, a spark could result or a section of the coil could become heated to an inordinately high temperature. If this were to occur, an explosion might well result within the gas valve assembly. Moreover, such an explosion could proceed within an air-gas mixture throughout both the inlet and outlet lines to the valve housing. Furthermore, an explosion within the gas valve assembly would destroy or seriously damage the gas valve, thus causing an uncontrolled gas leak which could thereafter present an even greater major safety hazard. For these reasons, the use of electrical resistance coils, or electric heat motors as they are sometimes known, in association with gas valves for use with combustible gases has been widely suppressed.

SUMMARY OF THE INVENTION

It is an object of the present invention to render explosion resistant a gas valve employing an electrical resistance coil. This is achieved by isolating the electrical resistance coil from the main gas flow line by containing it within a separate compartment formed within the gas valve assembly. Any explosion which might be initiated by the electrical resistance coil is thereby confined to the interior of such a compartment. This prevents the spread of the explosion and also prevents the occurrence of a major gas leak from the valve assembly.

A further object of the invention is to provide a separate explosion resistant compartment within a housing enclosing a valve chamber. Such a compartment is preferably formed with means which provides for the release of pressure generated by an explosion within the compartment while precluding the spread of such an explosion to the main gas line. This is achieved through the use of a plurality of pressure relief apertures or flame ports which are of sufficiently small cross section in relation to their length that flames can not travel from one end of the apertures to the other. Nevertheless such pressure relief apertures do provide a means by which the pressure built up during an explosion may be dissipated from the compartment enclosing the electrical resistance coil.

Yet another object of the invention is to isolate an electrical resistance coil in a manner such that failure of the explosion confining structure will not result in a major gas leak. This is achieved by constructing the compartment in a manner such that the strongest areas of the explosion resistant structure separate the main gas line from the compartment isolating the electrical resistance coil. Another portion of the explosion resistant structure isolates the electrical resistance coil from the surrounding atmosphere. This area is constructed of a relatively weaker material, so that if there is a failure at all in the explosion resistant barrier, the failure would not rupture the interface between the isolating compartment and the main gas line.

In a broad aspect the invention may be considered to be a gas valve assembly comprising: a housing enclosing a valve chamber and having inlet and outlet ports defined therein through which a combustible fluid enters and leaves the chamber. An explosion resistant structure forms a separate compartment within the chamber. An access aperture is provided to extend between the compartment and the chamber. Closure means is provided for operative association with one of the ports. A mechanical linkage extends from within the compartment and through the access aperture to the closure means. A heat sensitive actuating means is located within the compartment and is connected to the mechanical linkage. An electrical resistance coil likewise is located within the compartment and is proximately positioned with respect to the heat sensitive actuating means.

BRIEF DESCRIPTION OF THE DRAWINGS

The invention may be explained with greater particularly and clarity through reference to the accompanying drawings in which.

DETAILED DESCRIPTION OF THE INVENTION

Figure 1:
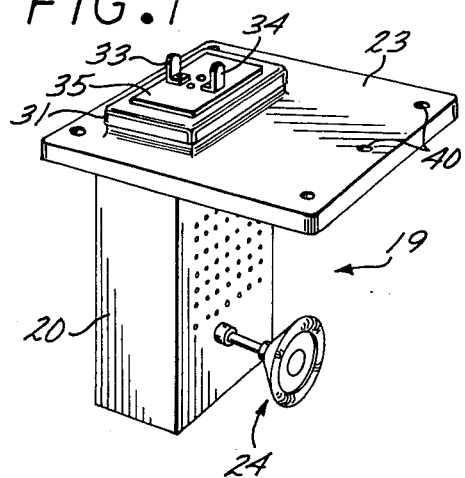
FIG. 1 is a perspective view of the explosion resistant structure.
Figure 2:
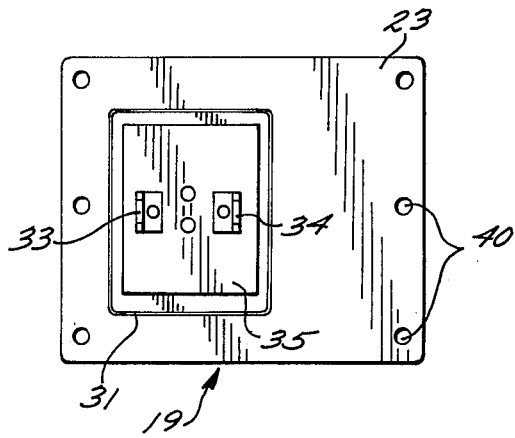
FIG. 2 is a top view of the structure of FIG. 1.
Figure 3:
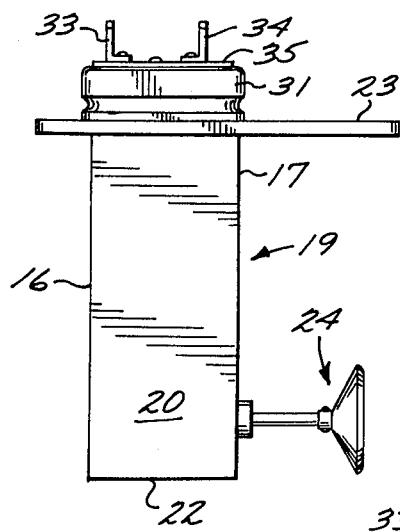
FIG. 3 is a side elevational view of the structure of FIG. 1.
Figure 4:
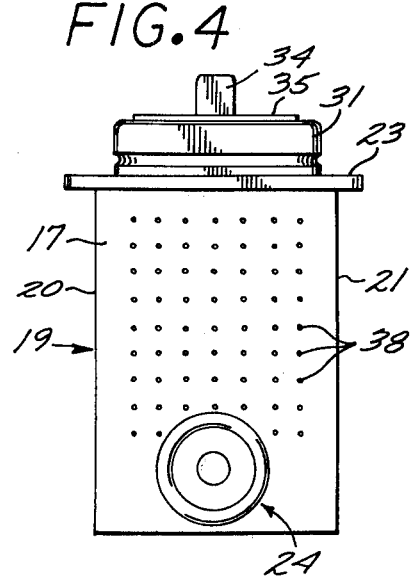
FIG. 4 is a front elevational view of the structure of FIG. 1.
Figure 5:
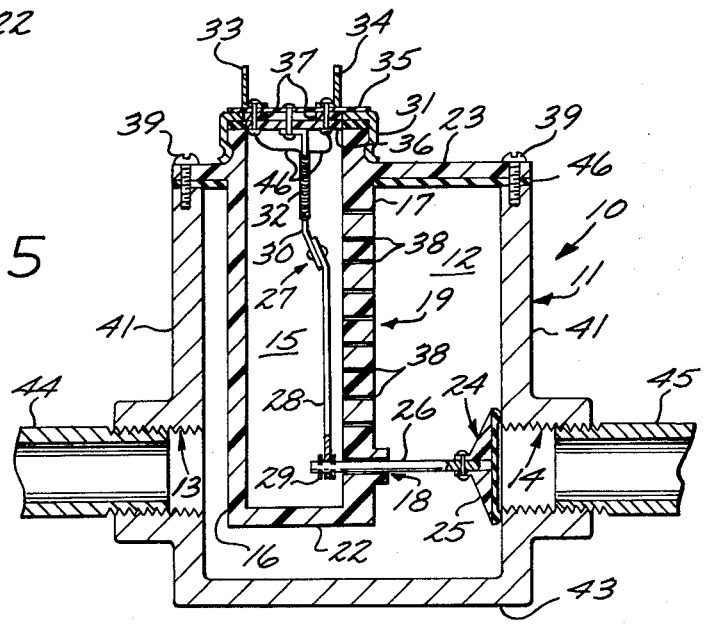
FIG. 5 is a sectional elevational view of a gas valve assembly employing the explosion resistant structure of FIG. 1.

Referring now to the drawings, there is illustrated a gas valve assembly 10. The gas valve assembly 10 includes a housing 11 which encompasses a valve chamber 12 and which has lateral walls 41 and an end wall 43. An inlet port 13 and an outlet port 14 are formed in the lateral walls 41 as indicated. An inlet pipe 44 is threadably engaged in the inlet port 13 and an outlet pipe 45 is similarly engaged in the outlet port 14. A passageway closure means in the form of a valve assembly 24 is positioned within the valve chamber 12. Thus a combustible gas, such as natural gas, may enter the valve chamber 12 through the inlet pipe 44, and pass through the passageway formed at the outlet port 14 unless the valve assembly 24 is closed, as indicated in FIG. 5. Gas flow is regulated by opening and closing the valve assembly 24.

Within the housing 11, an explosion resistant structure 19 defines a separate compartment 15 within the chamber 12. The explosion resistant structure 19 has explosion resistant sides 16, 17, 20, 21 and 22, and a top partition 23 which also serves as the top of the housing 11. The separate compartment 15 formed within the chamber 12 is constructed with an access aperture 18 defined in the wall 17. A rod 26, which is a valve stem for the valve assembly 24, is attached at one end to the valve cup 25 and is longitudinally reciprocal within the access aperture 18.

A bimetallic strip assembly 27 is provided and is located within the compartment 15. The bimetallic strip assembly 27 is secured at one end by a rivet attaching the element 30 of the bimetallic strip to the roof 36 of the compartment 15. The other element 28 of the bimetallic strip assembly 27 is riveted to the element 30 and extends lengthwise within the compartment 15. The element 28 terminates in a connecting joint 29, which grips the valve stem 26. The connecting joint 29 and the valve stem 26 together form a mechanical linkage coupling the bimetallic strip assembly 27 to the valve assembly 24.

An electrical resistance coil 32 is located within the compartment 15 and encircles the bimetallic strip element 30. The resistance coil 32 is connected by electrical leads 46 to terminals 33 and 34 at the exterior of the compartment 15. Conventional circuit connectors (not shown) may be attached from a thermostat to the terminals 33 and 34 to provide an actuating electrical current to the electrical resistance coil 32. Passage of such a current through the resistance coil 32 heats the bimetallic strip assembly 27, thereby causing the free end of the element 28 to deflect. Deflection to the left in FIG. 5 opens the outlet port 14. The bimetallic strip assembly 27 may be oriented so that upon heating, it deflects to the left thereupon opening the outlet port 14. Conversely, if no current is passed through the electrical resistance coil 32, the free end of the element 28 moves to the right, thereby closing the port 14. It should be kept in mind that the thermostat design may be such that the reverse operation is desired. That is, heating of the coil 32 may close the valve assembly 24, while cooling of the coil may open it. This reverse operation is easily effected by reversing the orientation of the bimetallic strip assembly 27 within the compartment 15.

The explosion resistant structure 19 is molded of appropriate phenolic plastic, such as Durez 16744 or Plenco 400. A suitable top or cap 31 is provided for the structure 19 which may crimped or fastened by other suitable means about the vertically extending walls 16, 17, 20 and 21 at the upper ends thereof, as depicted in the drawings. A laterally extending partition 23 is also formed as part of the molded structure 19. This partition 23 is fastened to the walls 41 of the housing 11 by means of machine screws 39 that extend through holes 40. A gasket 46 is provided to insure a gas tight seal.

The top of the structure 19 is not formed of molded phenolic plastic in the same thickness as the walls located within the chamber 12. Rather, a thinner roof 36 is provided. Insulators 37 and an insulating plate 35 are attached to the roof 36 to confine the interior edges of the cap 31.

Since the roof 36 and the insulating plate 35 are thinner than the interior walls 16, 17, 21 and 22 and the partitions 23 of the explosion resistant structure, any failure or rupture in the structure 19 will occur at the roof 36. While the roof 36 is designed to withstand such an explosion, it is preferable that failure occur, if at all, at the roof 36, rather than at one of the interior walls within the chamber 12. Thus, the possibility of a failure which might result in a major gas leak from the inlet pipe 44 or an explosion that might spread through the pipes 44 and 45 is all but precluded.

The access aperture 18 and the valve stem 26 are designed with a close tolerance. Thus, the area between the valve stem 26 and the access aperture 18 serves as a flash port. The length of the aperture 18 is sufficiently great with respect to the area of tolerance that flames from an explosion within the compartment 15 cannot reach the chamber 12 through the access aperture 18. One suitable embodiment was constructed with the valve stem 26 of a cylindrical configuration about 0.094 inches in diameter, and with the access aperture a cylindrical bore about 0.099 inches in diameter.

A plurality of pressure relief apertures 38 are similarly provided to serve as flash ports. The apertures 38 are uniformly constructed such that the thickness of the wall 17 in which they are formed is at least about ten times the greatest transverse dimension of any of the pressure relief apertures 38. One suitable embodiment of the invention involves the construction of 49 pressure relief apertures of about 0.025 inches in diameter extending through the wall 17. The wall 17 was about one-quarter inch in diameter. With this embodiment, even induced explosions of gases having the highest rate of flame propogation, such as hydrogen or A.G.A. supplied manufactured test gas were confined within the compartment 15 and did not reach the chamber 12.

The present invention is not intended to prevent an explosion in a heat motor gas valve, such as the gas valve assembly 10. Rather, it provides a means by which the explosion can be controlled and limited to prevent damage which might result in a hazardous situation.

The parameters used in the design of the embodiment of the invention depicted in the drawings are for purposes of illustration only, and alternative dimensions and parameters are possible without departing from the scope of the basic concept of the invention.

I claim:
1. A gas value assembly comprising:
 a. a housing enclosing a valve chamber and having inlet and outlet ports defined therein through which a combustible fluid enters and leaves said chamber;
 b. an explosion resistant structure forming a separate compartment within said chamber and through which an access aperture is defined;
 c. closure means operatively associated with one of the aforesaid ports;
 d. mechanical linkage means extending from within said compartment through said access aperture to said closure means;
 e. heat sensitive actuating means located within said compartment and connected to said mechanical linkage means, and f. an electrical resistance coil located within said compartment and proximately positioned with respect to said heat sensitive actuating means.

2. The gas valve assembly of claim 1 further characterized in that a plurality of pressure relief apertures are formed in said explosion resistant structure.

3. The gas valve assembly of claim 2 further characterized in that the thickness of said explosion resistant structure at said apertures is at least about ten times the greatest transverse dimension of said pressure relief apertures.

4. The gas valve assembly of claim 1 wherein said mechanical linkage means comprises a longitudinally reciprocal rod and said access aperture is a longitudinal bore forming a guideway for movement of said rod.

5. The gas valve assembly of claim 1 wherein at least a portion of said compartment is bounded by a partition separating said compartment from ambient atmosphere, and said partition is designed to be less resistant to forces generated by an explosion than is the portion of said explosion resistant structure located within said chamber.

6. The gas valve assembly of claim 4 wherein said rod is cylindrical and is about 0.094 inches in diameter and said bore is cylindrical and is about 0.099 inches in diameter.

7. The gas valve assembly of claim 4 wherein said heat sensitive actuating means comprises a bimetallic strip secured at one end within said compartment and connected at the other end to said reciprocal rod, and wherein said electrical resistance coil encircles said bimetallic strip and has electrical leads associated therewith forming an electrical connection to the exterior of said housing.

* * * * *

UNITED STATES PATENT OFFICE
CERTIFICATE OF CORRECTION

Patent No. 4,027,689　　　　　　　　Dated June 7, 1977

Inventor(s) Denis G. Wolfe

It is certified that error appears in the above-identified patent and that said Letters Patent are hereby corrected as shown below:

In the claims, Column 4, line 53, Claim 1 delete "value" and insert --valve--.

Signed and Sealed this

Thirteenth Day of September 1977

[SEAL]

Attest:

RUTH C. MASON
Attesting Officer

LUTRELLE F. PARKER
Acting Commissioner of Patents and Trademarks